(12) United States Patent
Bayerbach et al.

(10) Patent No.: US 8,215,971 B2
(45) Date of Patent: Jul. 10, 2012

(54) COUPLING ARRANGEMENT

(75) Inventors: Jan Bayerbach, Calw (DE); Jochen Heimsch, Fellbach (DE); Dieter Hoelzle, Deckenpfronn (DE); Willfried Weber, Schopfloch (DE)

(73) Assignee: H & B Electronic GmbH & Co., KG, Deckenpfronn (DE)

( * ) Notice: Subject to any disclaimer, the term of this patent is extended or adjusted under 35 U.S.C. 154(b) by 0 days.

(21) Appl. No.: 13/256,388

(22) PCT Filed: Feb. 18, 2010

(86) PCT No.: PCT/EP2010/000999
§ 371 (c)(1),
(2), (4) Date: Sep. 13, 2011

(87) PCT Pub. No.: WO2010/105722
PCT Pub. Date: Sep. 23, 2010

(65) Prior Publication Data
US 2012/0003855 A1 Jan. 5, 2012

(30) Foreign Application Priority Data

Mar. 14, 2009 (DE) ............... 20 2009 003 650 U

(51) Int. Cl.
*H01R 13/62* (2006.01)
(52) U.S. Cl. ........................................ 439/158
(58) Field of Classification Search ............ 439/133, 439/142, 145, 158, 195, 197, 299, 924.2
See application file for complete search history.

(56) References Cited

U.S. PATENT DOCUMENTS

| | | | |
|---|---|---|---|
| 2,334,875 A | 11/1943 | Hufferd | |
| 2,397,576 A | 4/1946 | Arthur | |
| 2,399,515 A | 4/1946 | Rush | |
| 2,712,454 A | 7/1955 | John | |
| 3,167,092 A | 1/1965 | Kelly et al. | |
| 3,964,511 A | 6/1976 | Cattermole | |
| 5,645,438 A * | 7/1997 | Cairns | 439/139 |
| 5,685,727 A * | 11/1997 | Cairns | 439/139 |
| 6,517,371 B1 * | 2/2003 | Shah | 439/342 |
| 7,641,487 B2 * | 1/2010 | Morgan | 439/158 |
| 7,789,436 B2 | 9/2010 | Bellanti | |
| 2008/0286986 A1 | 11/2008 | Rashkover | |

FOREIGN PATENT DOCUMENTS

| | | |
|---|---|---|
| DE | 4030381 A1 | 4/1992 |
| DE | 102004033567 A1 | 1/2006 |
| EP | 1148286 A2 | 10/2001 |
| WO | WO 2006131139 A1 | 12/2006 |
| WO | WO 2007147510 A1 | 12/2007 |

* cited by examiner

*Primary Examiner* — Tho D Ta
(74) *Attorney, Agent, or Firm* — Browdy and Neimark, PLLC

(57) ABSTRACT

The invention relates to a coupling arrangement (6) for releaseably connecting a first line segment (26) provided on a first unit (2) to a second line segment (28) provided on a second unit (4), comprising connecting means that can be applied to the first unit (2) complementary connecting means that can be applied to the second unit (4) and that can be fixed to the connecting means, and a control device (32) that can be positioned between the first line segment (26) and the second line segment (28) and that can be switched between a blocking position, in which the connection between the first line segment (26) and the second line segment (28) is blocked, and a flow position, in which the connection between the first line segment (26) and the second line segment (28) is open. The control device (32) comprises a control body (30) rotatably support between the blocked position and the flow position that can be positioned at a distance between the first line segment (26) and the second line segment (28) and in which an intermediate line segment (38) is embedded, by means of which the first line segment (26) can be connected to the second line segment (28).

34 Claims, 12 Drawing Sheets

COUPLING ARRANGEMENT

Figure 1:
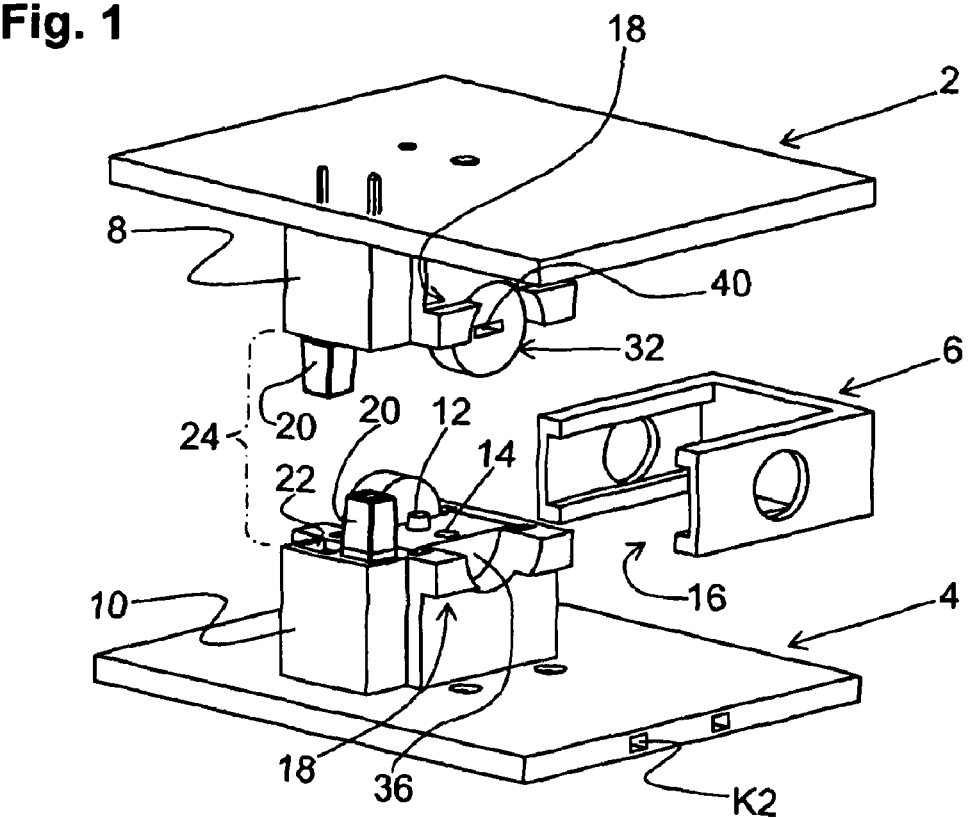

The present invention relates to a coupling arrangement for releasably connecting in a drip-free manner a first line segment provided on a first unit to a second line segment provided on a second unit according to the preamble of claim 1. The coupling arrangement comprises connecting means for this purpose which are capable of being fastened to the first unit, and mating connecting means which are capable of being fastened to the second unit, the mating connecting means being fixable directly or indirectly to the connecting means. The coupling arrangement further comprises a control device capable of being positioned between the first line segment and the second line segment. The control device is switchable between a blocked position in which the connection between the first line segment and the second line segment is blocked, and a flow position in which the connection between the first line segment and the second line segment is open.

DE 40 30 381 describes a coupling arrangement for connecting/disconnecting in a drip-free manner two lines for liquids. The coupling arrangement has two connecting pieces for this purpose, each of which has a channel that is in flow connection with the associated line. Both connecting pieces have at the end thereof a headpiece oriented in the direction of alignment of the respective channel, on which headpiece oblique bores are formed that branch off from the respective channel, the headpieces being fixable to one another. Furthermore, a sleeve on the inside of which a recess is embedded is supported on one of the two connecting pieces. The sleeve is positionable relative to the two headpieces in such a way that the recess forms a bypass via which the oblique bores of both connecting pieces are capable of being connected to one another.

The known coupling arrangement has the shortcoming that it creates relatively high flow losses and is capable of being used only for a single line. Moreover, because of the complex design thereof, it is relatively expensive and suitable only for relatively large flow cross sections.

The aim of the invention is to prevent in a drip-free coupling arrangement the aforementioned shortcomings and attain versatile application possibilities while keeping the flow losses relatively low.

This aim is achieved by a coupling arrangement having the features of claim 1. The control device has a control body capable of being adjusted translationally or by rotation which is positioned in the connected state of the coupling arrangement in a space, that is to say in a direct connection between the first line segment and the second line segment. Embedded in this control body is an intermediate line segment via which the first line segment is connectable to the second line segment in the flow position. The control body is supported for rotation between the blocked position and the flow position. In this way the intermediate line segment forms a movable connecting line between the line segments, the cross section of the connecting line being formed completely within the control body. Owing to this complete formation of the intermediate line segment within the control body and arrangement thereof so as to directly linearly connect both line segments it is possible to create or completely disconnect the mutual connection of the line segments by means of a slight relative movement of the control body relative to the line segments. In the flow position the intermediate line segment can be brought into mutual alignment with at least one respective end segment of the two line segments, enabling a highly rectilinear connection of the line segments via the intermediate line segment that causes only very small flow losses.

Owing to the rotatably supported control body the coupling arrangement can additionally be designed relatively compact overall.

In a particularly advantageous embodiment an intermediate cross section of the intermediate line segment matches, in terms of shape and size, a first cross section of the first line segment and a second cross section of the second line segment, thereby minimizing the flow losses.

Furthermore, it is advantageous when the intermediate line segment is provided in a through bore of the control body, thereby enabling the intermediate line section to have a minimal extent.

In a particularly advantageous embodiment the control body has a first partial body which is guided on a first housing assigned to the first line segment, and a second partial body which is guided on a second housing assigned to the second line segment. Both partial bodies are capable of being contacted to one another. Owing to this two-part embodiment of the control body, it is possible in the blocked position to close and disconnect each of the two line segments from the other by means of a partial body. In the connected state of the coupling arrangement the partial bodies, which are in contact with one another in this arrangement, are capable of being actuated jointly.

Additionally, it is advantageous when the connecting means on the first partial body have coding means that are capable of being plugged together with mating coding means of the second partial body that serve as mating connecting means. Such coding means and mating coding means can serve on one hand for coupling the two line segments. On the other hand, the coding means may be used to ensure, for example in the case of a system having a plurality of coupling arrangements, that only line segments that are associated to one another are capable of being connected to one another.

The connecting means and mating connecting means on the control body advantageously have form-closure means and mating form-closure means. Via same, a form closure between both line segments is capable of being created in the flow position. In the blocked position, on the other hand, the form closure is releasable. This makes it possible, according to the position of the control body, to also release or create a form closure between the first and second unit in addition to switching between the blocked position and the flow position.

Additionally, it is advantageous when the connecting means and mating connecting means have locking means and mating locking means separately from the control body, by means of which the line segments are capable of being locked to one another regardless of the position of the control device. The first unit and the second unit are thereby capable of being securely fixed to one another also in the blocked position.

In a further advantageous embodiment the control body has a substantially cylindrical outer surface. Same is guided through a substantially cylindrical inner surface of the housings. The cylindrical shape of the control body and of the inner surface of the housing guide enable a sealing mutual contact of both elements.

It is advantageous in this arrangement when the control body has a ring-section-shaped edge functioning as a form-closure means which, in the connected state of the coupling arrangement, creates or releases a form closure with a mating form-closure means on the housing according to the rotational position of the control body. In this way a robust form closure between the two line segments can be created via the control body simultaneously with adjusting the control body between the blocked position and the flow position.

Alternatively thereto, it is advantageous when the control body has male elements on one of the partial bodies and female elements complementary thereto on the respective other partial body, which are capable of being plugged together in the blocked position along an assembly direction and which, in particular after rotation of the control body by 90°, create a form closure in the flow position along the assembly direction. In this way a releasable form closure that is created by the control member itself can be implemented using particularly simple means.

It is advantageous in this arrangement when at least the control body can be put together of two structurally identical partial bodies, making the control body as a whole easier and more cost effective to produce. Furthermore it is also possible for the connecting means as a whole and/or for the components of the coupling arrangement that form the line segments to be produced at least in part from structurally identical elements. In this way the manufacturing costs for the coupling arrangement can be noticeably reduced through the dual use of a plurality of elements.

Additionally, it is favorable when the control body is adjustable via a translationally adjustable actuating means, a direction change gear unit being provided between the control body and the actuating means that converts a translational movement of the actuating means into a rotation of the control body. In this manner it is possible, for example, to design the actuating means as a slide that is slideably mounted on a housing in which one of the line segments is provided and sits closely against said housing. In this way the control body is adjustable with ease between the blocked position and the flow position. On the other hand, inadvertent actuation is prevented by the actuating means sitting closely against the housing.

The line segments and the intermediate line segment advantageously form at least one fluid line that is capable of being disconnected drip-free, thereby enabling the coupling arrangement to be used, for example, in a cooling system of an electronic module.

Alternatively thereto, the line segments and the intermediate line segment form at least one electric line, thereby enabling the coupling arrangement to be used, for example, for creating a power supply or a communication or measuring connection.

In a particularly advantageous embodiment the coupling arrangement forms at least one electric line as well as at least one fluid line, both of which are capable of being connected or disconnected according to the position of the control body. In this way both lines are capable of being connected or disconnected simultaneously through actuation of the control body. This enables the coupling arrangement to be used not only in purely fluid systems or purely electrical systems, but also in combined systems.

Additionally, it is favorable when the connecting means have at least one electrical plug-type connection, thereby additionally enabling an electrical connection to be created when connecting the two line segments, which is provided in addition to the line formed by the line segments and intermediate line segment and, as a result, is capable of being operated independently of the position of the control body.

The first unit and/or the second unit are advantageously formed by fluid-cooled printed circuit boards, thereby enabling both units to be separated in a drip-free manner and damage to the printed circuit boards to be prevented.

Advantageously, at least one of the housings is capable of being mounted via a plug-type connection to the respective printed circuit board, thereby enabling a particularly simple connection of the coupling arrangement to the respective printed circuit board.

It is favorable in this arrangement when the plug-type connection can be created via a connecting ferrule that is capable of being connected to a cooling channel of the printed circuit board via a first connection and to one of the line segments via a second connection in the form of a plug-type connection. In this way the coupling arrangement can be arranged by selecting a suitable length for the connecting ferrule at a desired distance from the printed circuit board in order, for example, to make available adequate installation space for electronic components of the printed circuit board. Moreover, such a connecting ferrule is capable of being fixed to the respective printed circuit board prior to or concurrently with the soldering process, for example by gluing or soldering or also by means of a plug-type connection. Fastening the respective housing to the printed circuit board, on the other hand, can take place at a later time by simply plugging the housing onto the printed circuit board, thereby enabling the production and assembly of the printed circuit board including the coupling arrangement to be simplified significantly.

It is furthermore favorable in this arrangement when the connecting ferrule has at least one electrically conducting outside that is insulated with respect to a fluid channel extending through the ferrule, thereby enabling both a fluid connection and an electrical connection to be created via the connecting ferrule.

The plug-type connection is advantageously provided at an edge of the printed circuit board at which a cooling channel exits, which makes a particularly flat design of the printed circuit board possible. The respective housing can, like in the afore-described embodiments of the coupling arrangement, have a curvature of the respective line segment, in order, for example, to reroute a cooling fluid into a different direction upon exiting from a printed circuit board.

Figure 2:
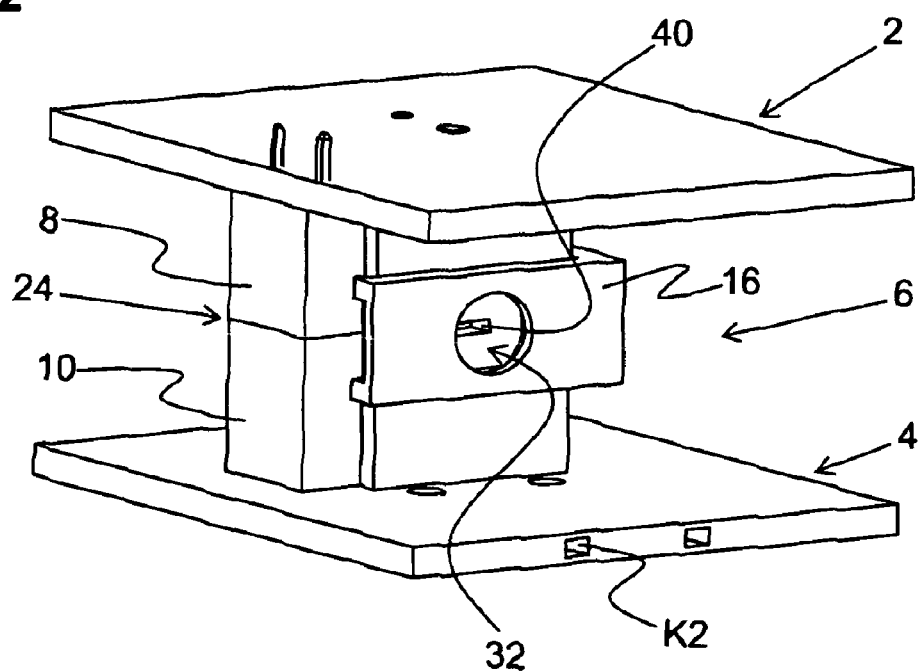
Figure 3:
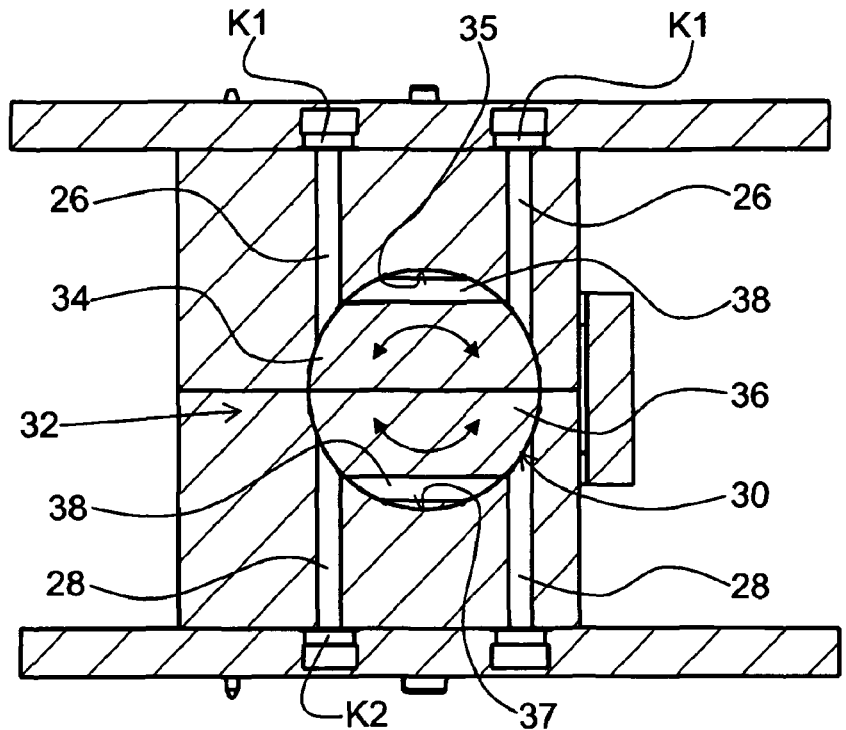
Figure 4:
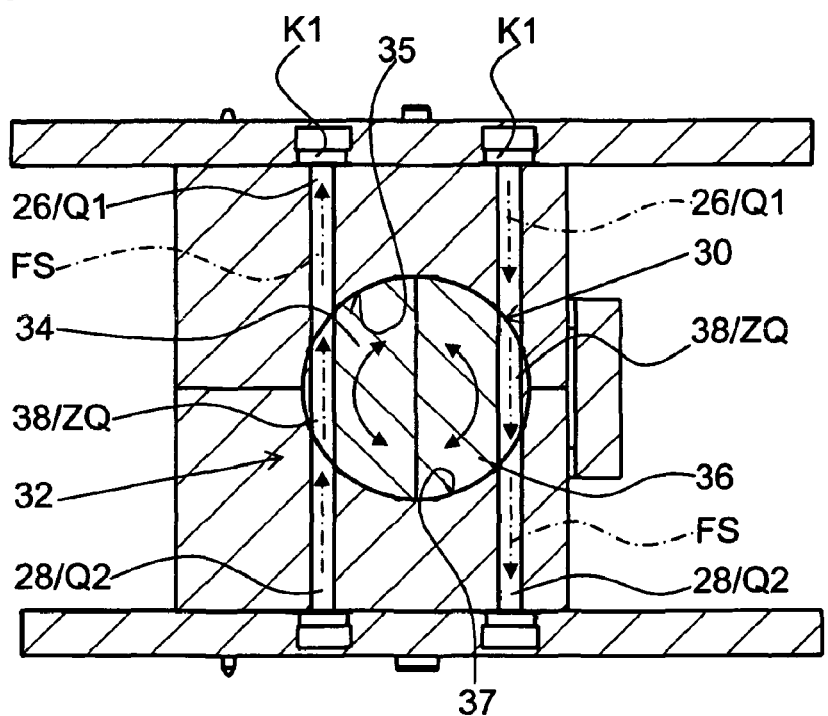
Figure 5:
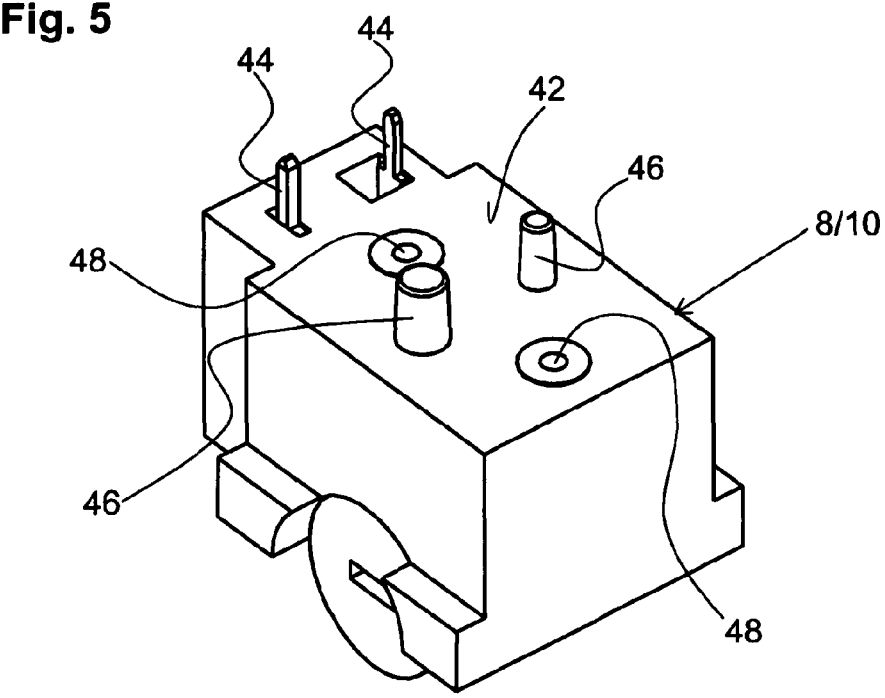
Figure 6:
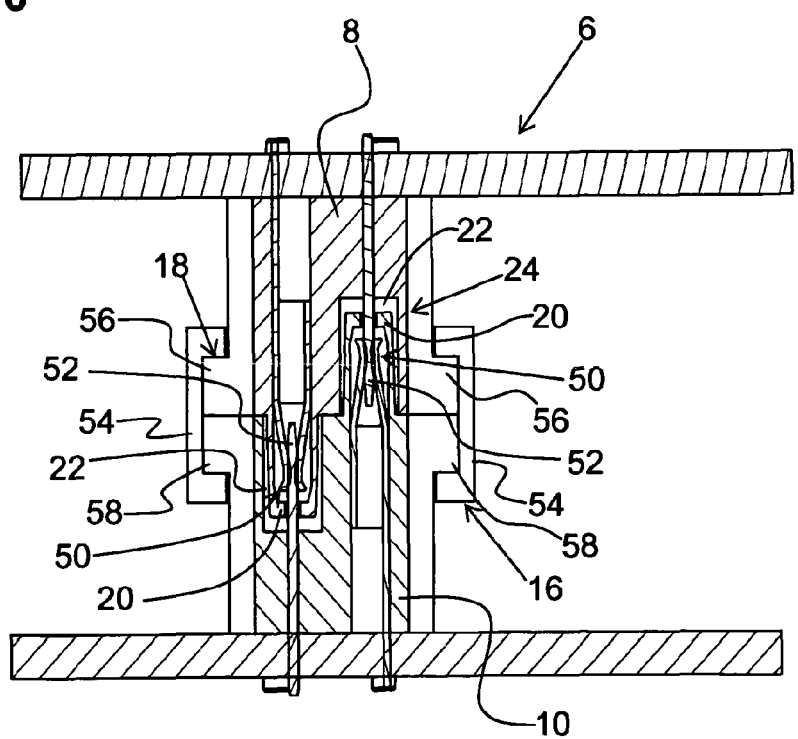

An illustrative embodiment of the invention is shown in the figures, in which:

FIG. 1 shows a perspective view of the coupling arrangement according to the invention in the disconnected state, FIG. 2 shows a perspective view of the coupling arrangement according to FIG. 1 in the connected state, FIG. 3 shows a section through the coupling arrangement according to FIG. 2 at the level of line segments for creating a fluid connection, in a blocked position, FIG. 4 shows a section through the coupling arrangement according to FIG. 3 in a flow position, FIG. 5 shows a perspective view of an underside of a housing of the coupling arrangement, FIG. 6 shows a section through an electrical connection of the coupling arrangement according to FIG. 2

Figure 7:
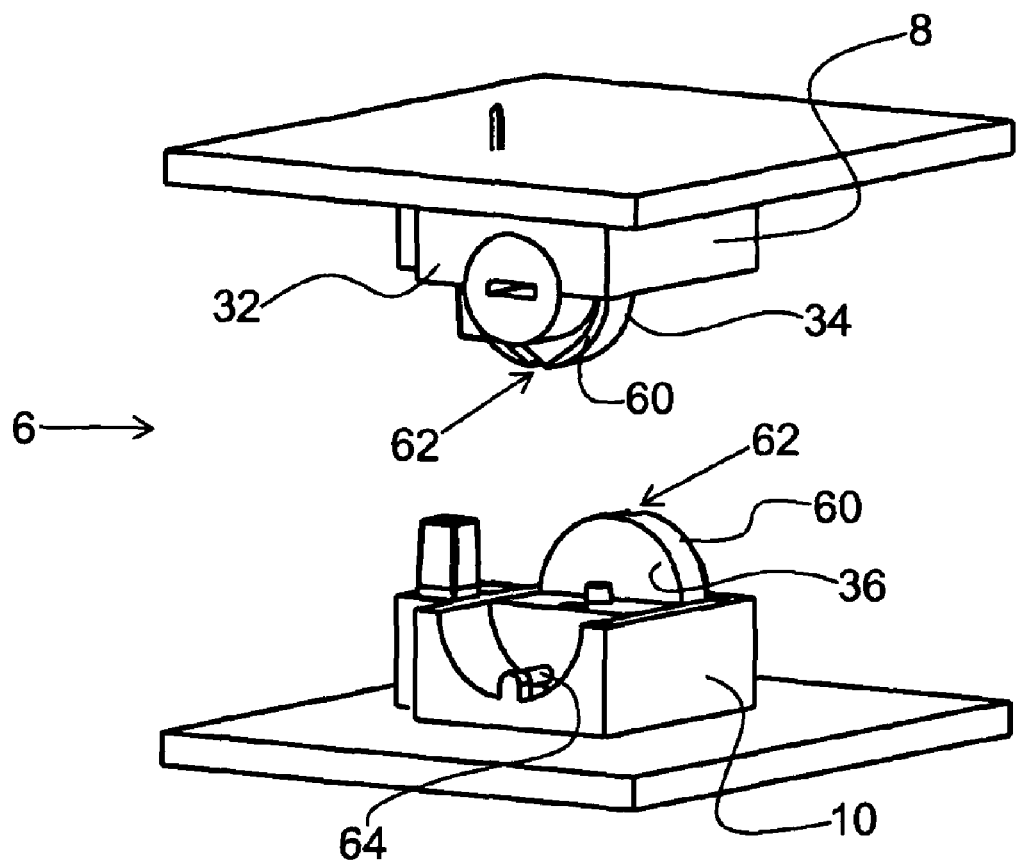
Figure 8:
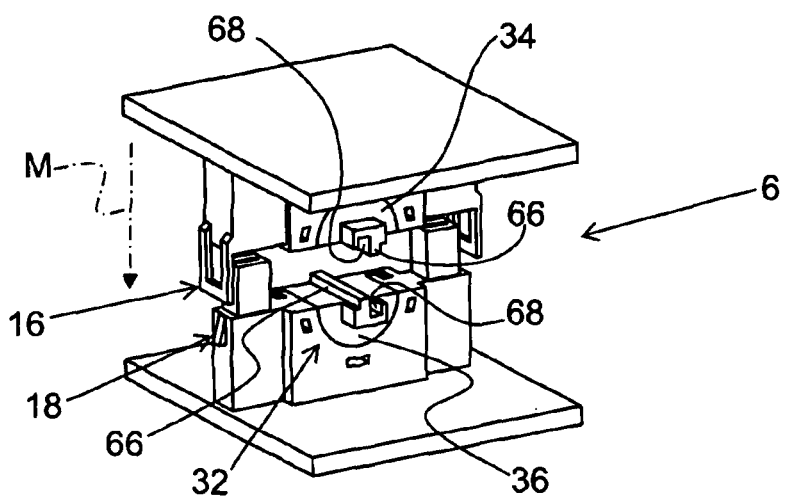
Figure 9:
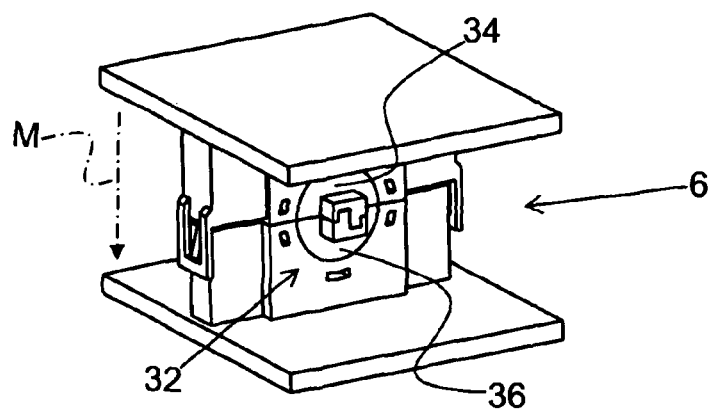
Figure 10:
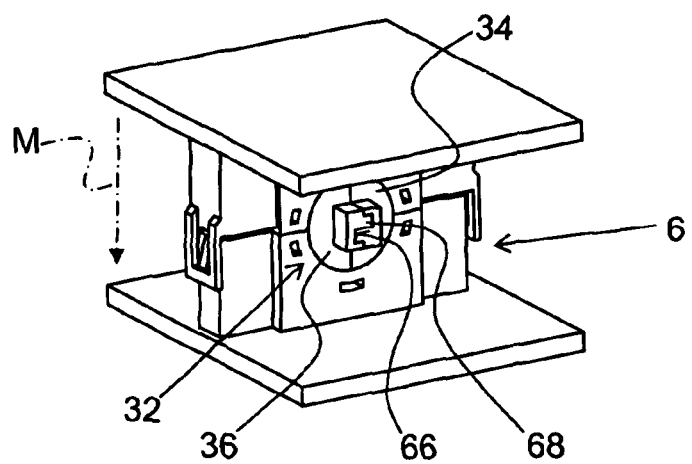
Figure 11:
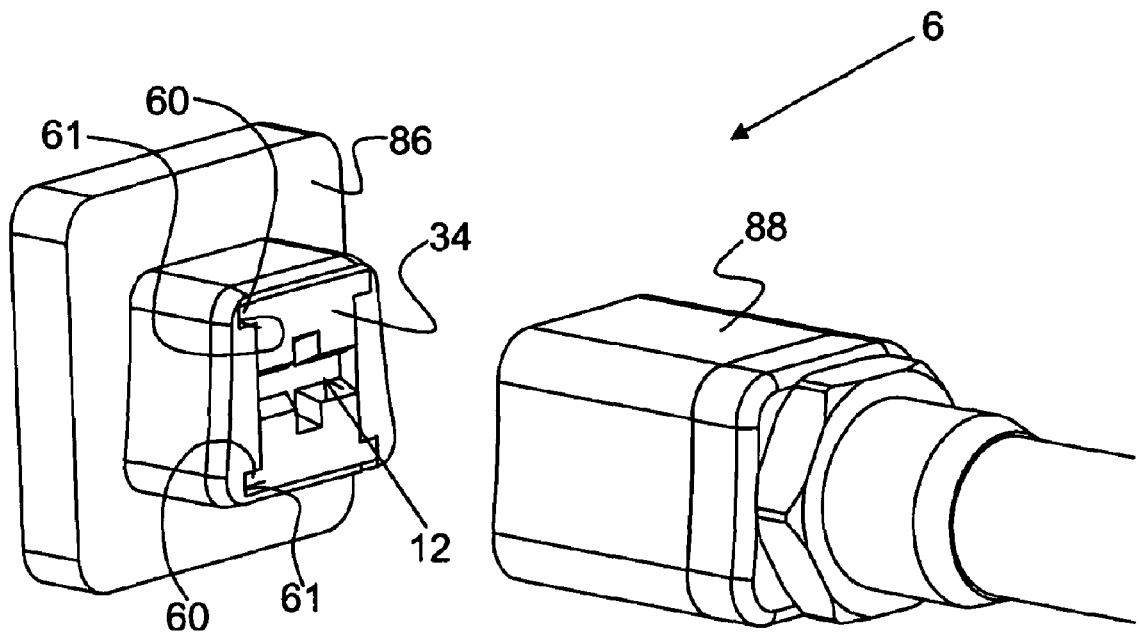
Figure 12:
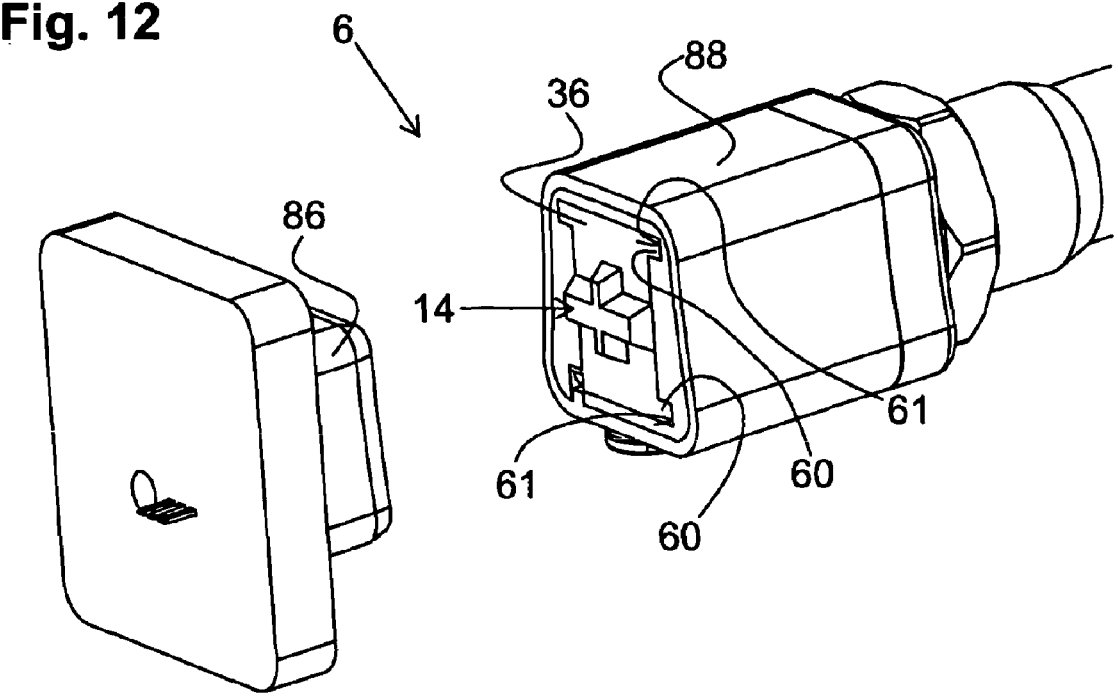
Figure 13:
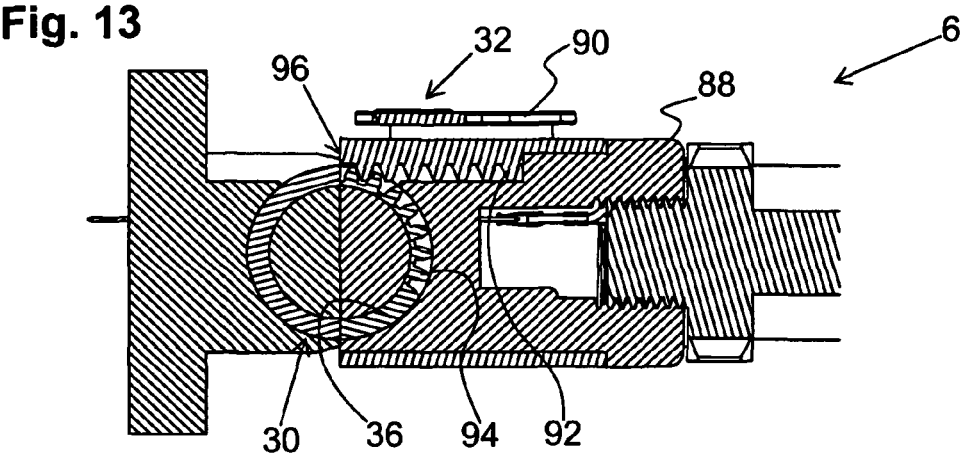
Figure 14:
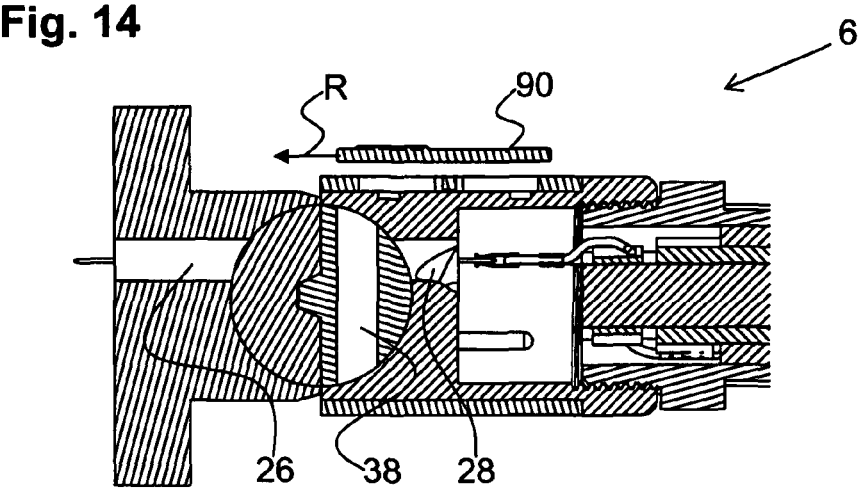
Figure 15:
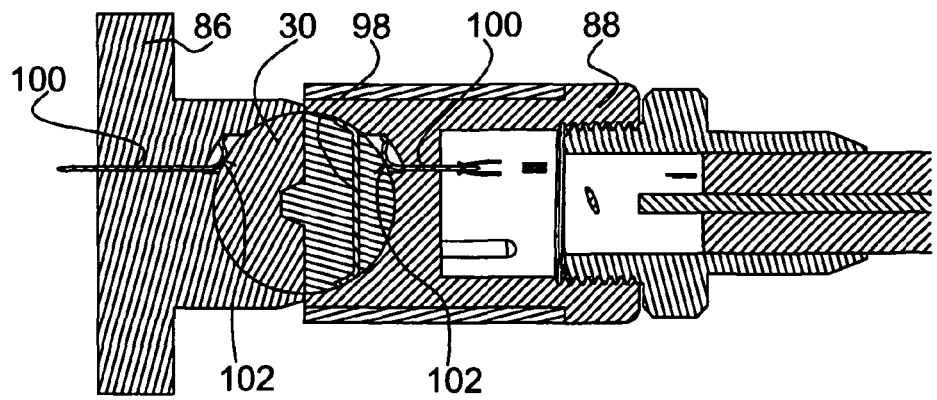
Figure 16:
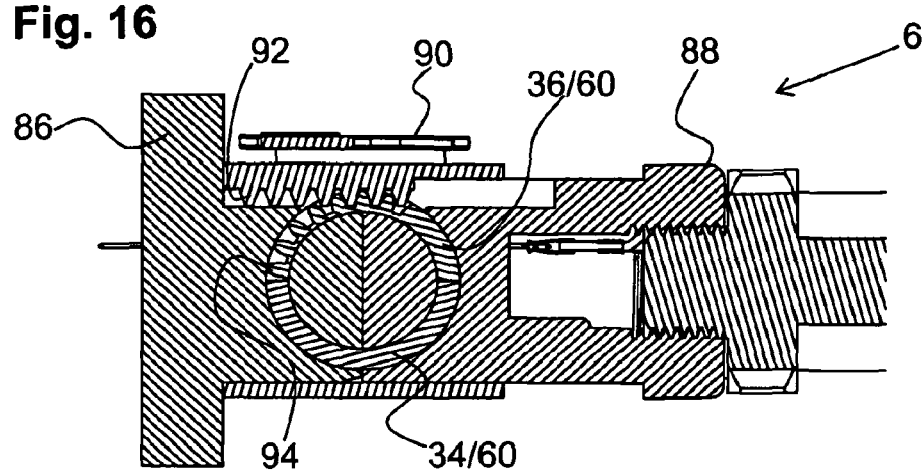
Figure 17:
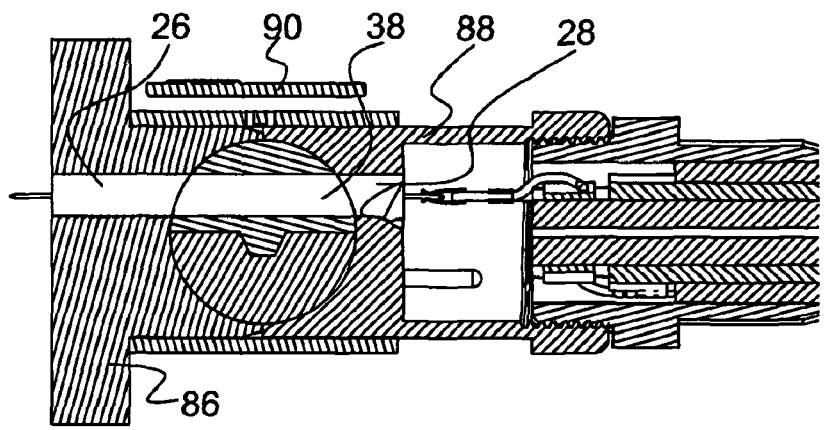
Figure 18:
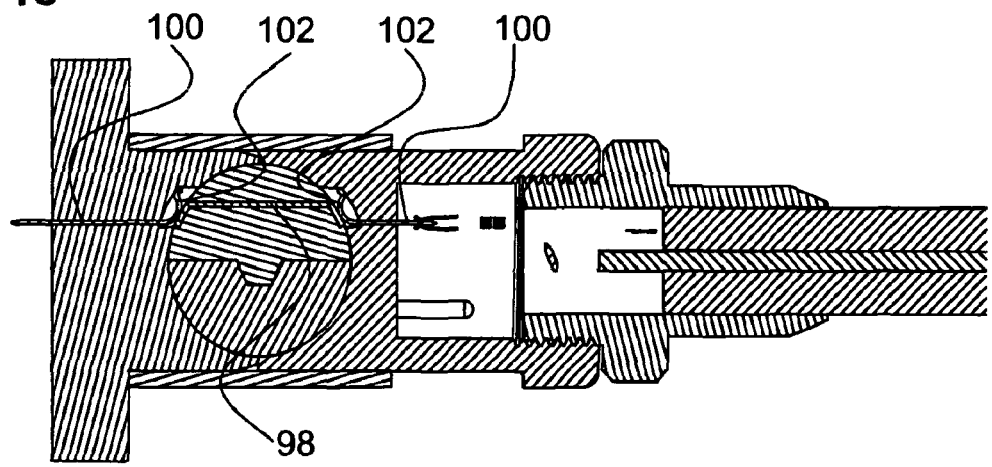
Figure 19:
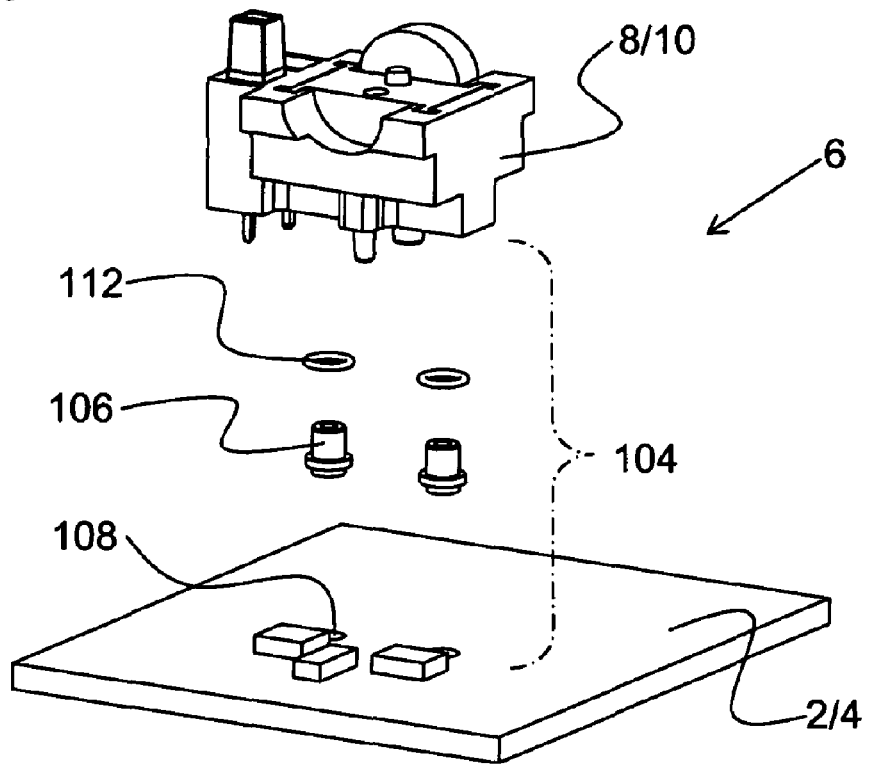
Figure 20:
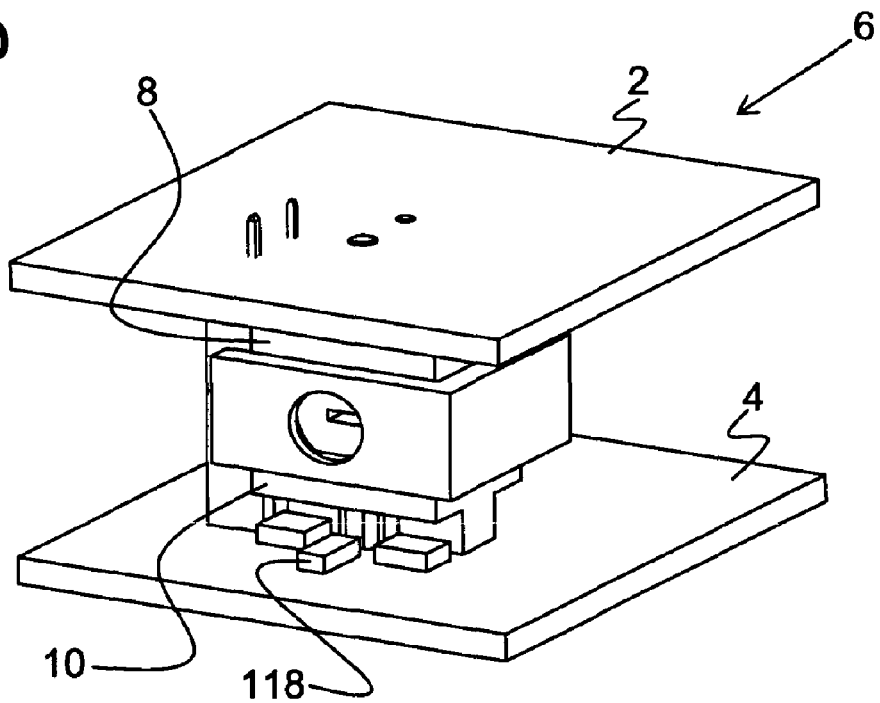
Figure 21:
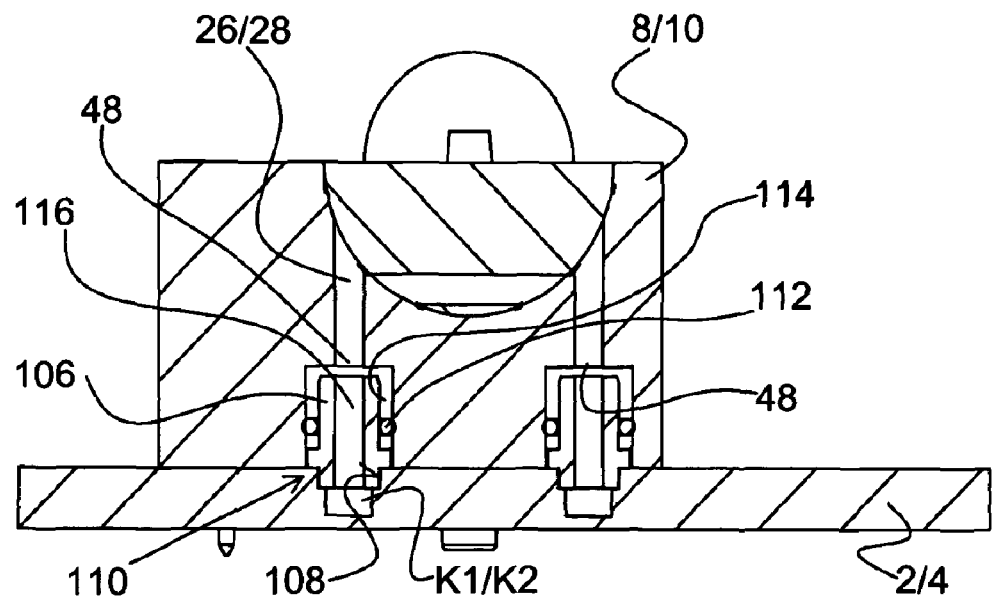
Figure 22:
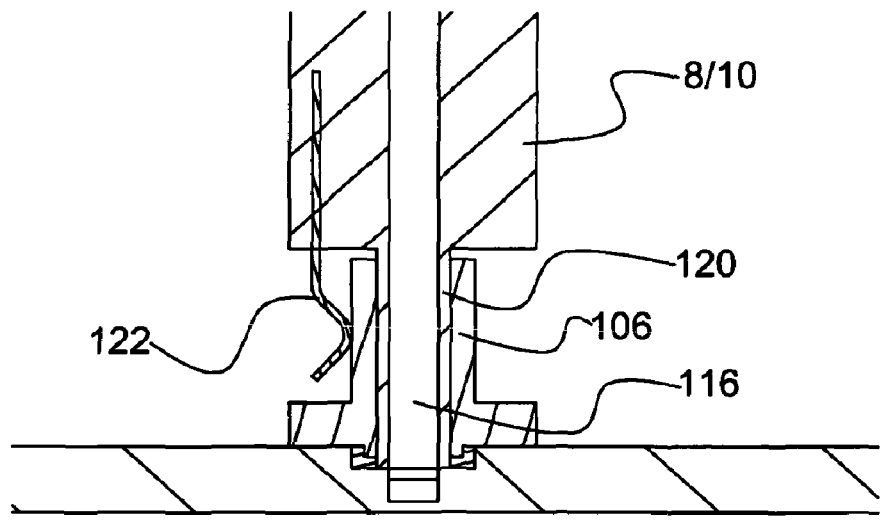
Figure 23:
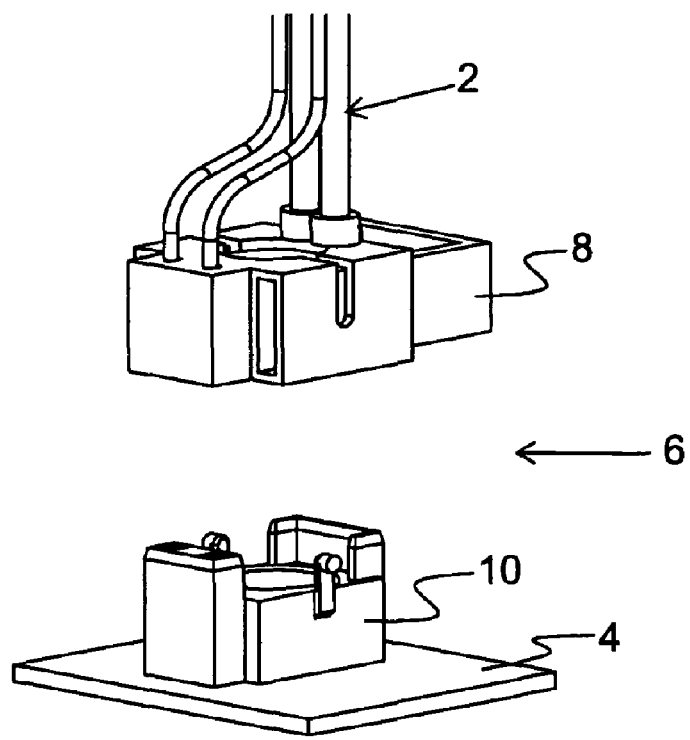
Figure 24:
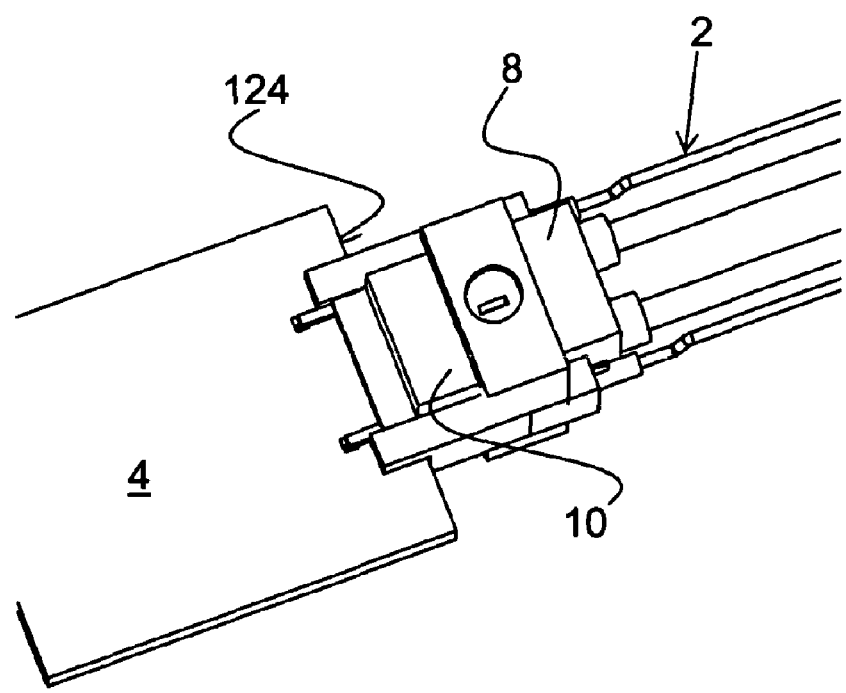

FIG. 7 shows a perspective view of a first alternative embodiment of the coupling arrangement in the disconnected state, FIG. 8 shows a perspective view of a second alternative embodiment of the coupling arrangement in the disconnected state, FIG. 9 shows a perspective view of the coupling arrangement according to FIG. 8 in the connected state in the blocked position, FIG. 10 shows a perspective view of the coupling arrangement according to FIG. 9 in the flow position, FIG. 11 shows a perspective view onto a first plug element of a fourth alternative embodiment of the coupling arrangement in the disconnected state, FIG. 12 shows a perspective view onto a second plug element of the coupling arrangement according to FIG. 11, FIG. 13 shows a section through the coupling arrangement according to FIGS. 11 and 12 in the connected state in the blocked position at the level of a direction change gear unit, FIG. 14 shows a section through the coupling arrangement according to FIG. 13 at the level of the line segments, FIG. 15 shows a section through the coupling arrangement according to FIG. 13 at the level of an electrical conductor of the control body, FIG. 16 shows a section through the coupling arrangement according to FIG. 13 in the flow position at the level of the direction change gear unit, FIG. 17 shows a section through the coupling arrangement according to FIG. 16 at the level of the line segments, FIG. 18 shows a section through the coupling arrangement according to FIG. 16 at the level of the electrical conductor of the control body, FIG. 19 shows a perspective view of a plug-type connection between the coupling arrangement and a printed circuit board, using the example of the coupling arrangement according to FIGS. 1 to 6, in the disconnected state, FIG. 20 shows a perspective view of the coupling arrangement with the plug-type connection according to FIG. 19 in the plugged-together state, FIG. 21 shows a section through the plug-type connection according to FIG. 19 in the plugged-together state, FIG. 22 shows a section through an alternative plug-type connection, FIG. 23 shows a perspective view of the coupling arrangement according to the invention in an alternative use between a printed circuit board and a cable/line strand, in the disconnected state, FIG. 24 shows a perspective view of the coupling arrangement according to the invention in a further alternative use between an edge of a printed circuit board and a cable/line strand, using the example of the coupling arrangement according to FIGS. 1 to 6, and FIG. 25 shows a section of the coupling arrangement according to the invention in a further use between two cable/line strands.

FIGS. 1 and 2 show a first unit 2 and a second unit 4, each of which are formed by an electronic printed circuit board. The units 2 and 4 are capable of being connected to one another via a coupling arrangement 6 that has a first housing 8 connected to the first unit 2 and a second housing 10 connected to the second unit 4.

The two housings 8, 10 are capable of being releasably fixed to one another via connecting means and mating connecting means. Same have, for example, nap-shaped coding means 12 and bore-shaped mating coding means 14 designed to be complementary thereto, locking means 16 and mating locking means 18 for producing a releasable form closure and electrical plugs 20 and corresponding plug receptacles 22 for producing an electrical plug-type connection 24. Both the coding means 12 and the mating coding means 14, as well as the plugs 20 and plug receptacles 22 are provided on both sides, that is to say one on each of the two housings 8, 10. In this way, both a paired electrical plug-type connection 24 and a paired coding connection is created when the two housings 8, 10 are joined to one another.

The coupling arrangement 6 serves, in addition to producing the electrical plug-type connection 24, in particular for creating a fluid connection between cooling channels K2 of the second unit 4 and cooling channels K1 of the first unit, as shown in FIGS. 3 and 4. The fluid connection is capable of being created and disconnected in a drip-free manner, in order to prevent potential damage to the printed circuit board.

The coupling arrangement 6 has first line segments 26 for this purpose in the first housing 8 and second line segments 28 in the second housing 10 which are aligned coaxially to one another with an interposed cylindrical control body 30 of a control device 32. The control body 30 in this arrangement is switchable between a blocked position according to FIG. 3 in which the connection between the first line segments 26 and the second line segments 28 is blocked, and a flow position in which the connection between the first line segments 26 and the second line segments 28 is open.

Additionally, the control body has, as can further be seen from FIGS. 3 and 4, a first partial body 34 that is supported and guided on a correspondingly cylindrically shaped inner surface 35 of the first housing 8. Said first partial body is in contact in the shown connected state with a structurally identical partial body 36 which is supported and guided on a cylindrically shaped inner surface 37 of the second housing 10. In order to create a connection between the line segments 26, 28, an intermediate line segment 38 is embedded in each of the partial bodies 34, 36 as a through bore.

In the blocked position of the control device 32 (according to FIG. 3) and disconnected state of the coupling arrangement 6 (according to FIG. 1) the intermediate line segments 38 are moved into a rotational position that is rotated by 90° with respect to the line segments 26, 28, in which position same are disconnected from the former. The line segments 26, 28 are therefore closed in this arrangement by the respective partial body 34, 36.

Upon connection of the coupling arrangement 6 according to FIG. 2 the control device 32 is capable of being rotated via a slot 40 serving to receive a commercially available tool, such as a screw driver (not shown), by 90° into the flow position shown in FIG. 4.

In the process the partial bodies 34, 36 that are in contact with one another and engage with one another via the coding means 12, 14, are simultaneously rotated into the flow position in which the intermediate line segments 38 are arranged coaxial to the line segments 26, 28 and therefore connect same to one another, in order to enable, as shown by the arrows FS in FIG. 4, a fluid flow of the cooling agent.

In order to minimize potential flow losses caused by the control body 30, the intermediate line segments 38 have intermediate cross sections ZQ that are identical in terms of size and shape to a first cross section Q1 of the first line segments 26 and to a second cross section Q2 of the second line segments 28.

FIG. 5 shows an underside 42 of one of the housings 8, 10. Provided on said underside are electric contact blades 44 and clamping bodies 46 that are capable of being fixed to corresponding clamp receptacles (not shown) of the units 2; 4 for a pluggable connection to the respective unit 2, 4. Furthermore, two line openings 48 can be seen via which the fluid connection to the cooling channels K1, K2 (see FIG. 2) is capable of being created.

FIG. 6 shows a section through the electrical plug-type connection 24 in the connected state of the coupling arrangement 6. As can be seen from this figure, the electrical plugs 20 have contact clamps 50 that are slipped onto contact blades 52 which are arranged within the plug receptacles 22.

As can further be seen from FIG. 6, the locking means 16 are formed by a yoke having two arms 54, each having a U-shaped profile. In the locked state shown, each of the arms 54 engages behind a first shoulder 56 of the first housing 8 and second shoulder 58 of the second housing 10, thereby fixing same to one another in a form-closed manner.

FIG. 7 shows an alternative embodiment of the coupling arrangement 6, in which a form-closure means in the form of a ring-section-shaped edge 60 is formed on each of the partial bodies 34, 36. This edge 60 has a discontinuity 62, at which a mating form-closure means formed by a rearwardly engaging element 64 can pass through the edge when both partial bodies 34, 36 are being connected. The rearwardly engaging element 64 is formed on the respective housing 8, 10. When the control device 32 is now rotated in the connected state from the shown blocked position into the flow position, the edge 60 is simultaneously rotated relative to the particular rearwardly engaging element 64, thereby creating a form-closed connection between the two housings 8, 10.

FIGS. 8 to 10 show a further alternative embodiment of the coupling arrangement 6. In this coupling arrangement, form-closure means in the form of male elements 66 and mating form-closure means in the form of complementary female elements 68 are formed on each of the partial bodies 34, 36 of the control body 30 that are capable of being plugged one into the other along an assembly direction M when the coupling arrangement 6 is being connected.

On rotation of the control device 32 from this blocked position shown in FIG. 9 into the flow position shown in FIG. 10, the male elements 66 together with the female elements 68 produce a form closure that fixes the partial bodies 34, 36 to one another in the assembly direction M.

FIGS. 11 and 12 show a further embodiment of the coupling arrangement 6 that functions according to the same basic principle as the afore-described embodiments.

In this embodiment the two partial bodies 34, 36 of the control body 30 are integrated into a first plug element 86 and into a second plug element 88 of a plug connection that may be used either as a pure fluid connection, a pure electrical connection or as a combined fluid and electrical connection.

As can be seen from FIGS. 11 and 12, the partial bodies 34, 36 form coding means 12 and mating coding means 14 in this arrangement as well. Further, both partial bodies 34, 36 form circular-section-shaped edges 60 that are guided in corresponding recesses 61 of the plug elements 86, 88.

In the coupling arrangement 6 shown here, the control device 32, as can be seen in particular from FIG. 13, has a slide switch 90 as an actuating means that is held translationally displaceable on the second plug element 88. The slide switch forms a linear toothing 92 which is in combing engagement with an arcuate toothing 94 that is provided on the second partial body 36.

The linear toothing 92 and the arcuate toothing 94 form a direction change gear unit 96 in this manner whereby a linear movement of the slide switch 90 is capable of being converted into a rotary movement of the control body 30.

In the blocked position of the slide switch 90, as shown in particular in FIG. 14, in the connected state of the coupling arrangement 6, the intermediate line segment 38 is oriented perpendicular to the two line segments 26, 28, thereby disconnecting the fluid connection, according to FIG. 3 of the first embodiment.

As can be seen from FIG. 15, an electrical conductor 98 may be provided in the control body 30 in addition to the intermediate line segment 38 for creating the fluid connection (according to FIG. 14), in order to simultaneously create or disconnect an electrical connection. In the blocked position shown, the electrical conductor 98 is initially spaced away from two electrical line segments 100 that are provided in the plug elements 86, 88 and are in contact each via a sliding contact 102 with the control body 30.

By displacing the slide switch 90 in the direction R, the second partial body 36 that is in combing engagement via the arcuate toothing 94 with the linear toothing 92 is now rotated together with the first partial body 34 by 90° as shown in FIG. 16.

As can further be seen from FIG. 16, the edges 60 each extend in the flow position over both plug elements 86, 88, thereby forming due to the circular-section shape thereof a form-closure by means of which the plug elements 86, 88 are securely fixed to one another in the flow position.

On rotation of the first partial body 34, the intermediate line segment 38 is being aligned so as to be coaxial relative to the line segments 26, 28. The coupling arrangement 6 is thus moved into the flow position in which a fluid connection is created via the control body 30 as shown in FIG. 17.

At the same time the two sliding contacts 102 of the electric line segments 100 are now also connected via the electrical conductor 98 in this flow position, such that an electrical connection which may be used, for example, for supplying power or for transmitting signals or data is simultaneously created parallel to the fluid connection.

Analogously, all of the afore-described embodiments of the coupling arrangements 6 can additionally or alternatively to the fluid connection shown in the figures also have an electrical connection that is capable of being connected or disconnected via the control body 30.

As shown in FIGS. 19 and 20 at the example of the coupling arrangement 6 according to FIGS. 1 to 6, the housings 8; 10 of the coupling arrangement 6 are capable of being connected via a plug-type connection 104 to the respective unit 2; 4.

At least one connecting ferrule 106 is provided for this purpose between the housing 8; 10 and the unit 2; 4, that is capable of being plugged with a first end into a corresponding plug receptacle 108 of the unit 2; 4 for forming a first connection 110, as can be seen in particular from FIG. 21. The connecting ferrule 106 may be held on the plug receptacle 108 solely by clamping action or may alternatively or additionally be connected to the unit 2; 4 by gluing or soldering. In particular, the first connection 110 may be created prior to or during a soldering process for equipping the unit 2; 4.

When the connection 110 has been created, the plug receptacle 108 is connected to one of the cooling channels K1; K2 of the unit 2, 4. A second end of the connecting ferrule 106 is capable of being plugged with an interposed seal 112 into a corresponding ferrule receptacle 114 of the housing 8; 10 that is provided on the line opening 48 of the corresponding line segment 26; 28. In this way the connecting ferrule 106 forms together with the corresponding housing 8; 10 a pluggable second connection 115 that can be created easily, in particular after completion of the aforementioned soldering process on the unit 2; 4.

Collectively, the cooling channels K1; K2 are connected in this way via a fluid channel 116 of the connecting ferrule 106 to the respective line segment 26; 28 for transportation of a cooling fluid. The length of the connecting ferrule 106 may be selected such that the respective housing 8; 10 is held at such a distance from the respective unit 2; 4 that there is room to fit in other components 118, such as in particular electronic components of a printed circuit board, as shown in FIG. 20.

As shown in FIG. 22, it is additionally possible for the connecting ferrule 106 to be produced from an electrically conductive material and to be insulated from the fluid channel 116 by an insulating bushing 120 that stands away from the housing 8; 10 and projects through the connecting ferrule 106. In this way an electrical contact to a corresponding contact element 122 of the housing 8; 10 can be created in addition to creating the fluid connection when creating the plug connection via the connecting ferrule.

FIG. 23 shows an alternative form of use of the coupling arrangement 6 according to the invention, in which the first housing 8 is provided on a cable/line strand as a first unit 2. The second housing 10, on the other hand, is provided on a second unit in the form of a printed circuit board.

FIG. 24 shows a further alternative form of use of the coupling arrangement according to the invention using the example of the embodiment according to FIGS. 1 to 6, wherein the first housing 8 is again formed on a first unit 2 in the form of a cable/line strand and the second housing 10 is formed such that it is capable of being fixed to an edge 124 of the second unit 4 in the form of a printed circuit board, so as to be connectable to a cooling channel (not shown) exiting therefrom.

Figure 25:
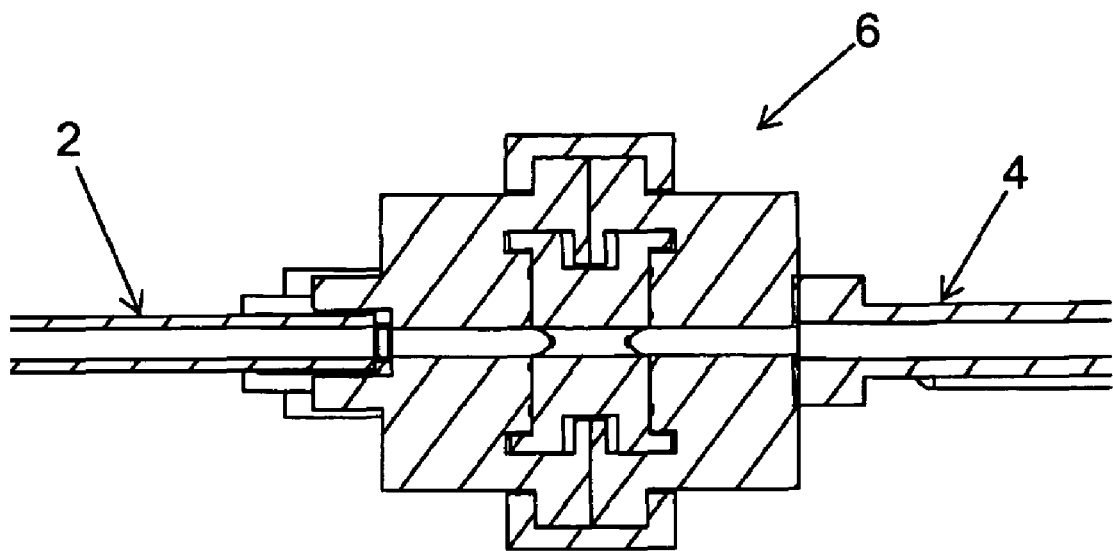

FIG. 25 shows a further embodiment of the coupling arrangement 6 in which both units 2, 4 are designed in the form of a cable/line strand.

Alternatively to the forms of use shown, all of the aforedescribed embodiments of the coupling arrangement 6 according to the invention may be connected via both housings 8, 10 to a unit 2, 4 in the form of a printed circuit board or in the form of a cable/line strand, respectively. Alternatively, however, it is possible for only one of the housings 8; 10 to be connected to a unit 2, 4 in the form of a printed circuit board or in the form of a cable/line strand, respectively.

What is claimed is:

1. A coupling arrangement (6) for releasably connecting a first line segment (26) provided on a first unit (2) to a second line segment (28) provided on a second unit (4), comprising:
   first connecting means that are capable of being fastened to the first unit (2);
   mating connecting means that are capable of being fastened to the second unit (4) and which are fixable to the first connecting means; and
   a control device (32) capable of being positioned between the first line segment (26) and the second line segment (28), the control device being switchable between a blocked position in which the connection between the first line segment (26) and the second line segment (28) is blocked, and a flow position in which the connection between the first line segment (26) and the second line segment (28) is open,
wherein the control device (32) has a control body (30) supported for rotation between the blocked position and the flow position and which is positionable in a space between the first line segment (26) and the second line segment (28) and in which an intermediate line segment (38) is embedded via which the first line segment (26) is connectable to the second line segment (28),
wherein the control body (30) has a first partial body (34) which is guided on a first housing (8) assigned to the first line segment (26) and a second partial body (36) which is guided on a second housing (10) assigned to the second line segment (28), both partial bodies (34, 36) being capable of being contacted to one another, and
wherein the first connecting means have at least one electrical plug-type connection (24) that is independent of the control device and is created when connecting the two housings (8, 10).

2. The coupling arrangement according to claim 1, wherein an intermediate cross section (ZQ) of the intermediate line segment (38) matches a first cross section (Q1) of the first line segment (26) and a second cross section (Q2) of the second line segment (28).

3. The coupling arrangement according to claim 1, wherein the intermediate line segment (38) is provided in a through bore of the control body (30).

4. The coupling arrangement according to claim 1, wherein the first connecting means and mating connecting means are on the first partial body (34) and have coding means (12) that are capable of being plugged together with mating coding means (14) of the second partial body (36).

5. The coupling arrangement according to claim 1, wherein the first connecting means and mating connecting means are on the control body (30) and have form-closure means and mating form-closure means via which a form closure between both line segments (26, 28) is capable of being created in the flow position, the form closure being releasable in the blocked position.

6. The coupling arrangement according to claim 1, wherein the first connecting means and mating connecting means have locking means (16) and mating locking means (18), by means of which the line segments (26, 28) are capable of being locked to one another regardless of the position of the control device (32).

7. The coupling arrangement according to claim 1, wherein the control body (30) has a substantially cylindrical outer surface and is guided through a substantially cylindrical inner surface (35, 37) of the housings (8, 10).

8. The coupling arrangement according to claim 1, wherein the control body (30) has a ring-section-shaped edge (60) functioning as a form-closure means and forming a form-closed connection with a mating form-closure means on the housing according the rotational position of the control body (30).

9. The coupling arrangement according to claim 1, wherein the control body (30) has male elements (66) on one of the partial bodies (34, 36) and female elements (68) complementary thereto on the respective other partial body (34, 36), the male and female elements being capable of being plugged together in the blocked position along an assembly direction (M) and creating a form closure in the flow position along the assembly direction (M).

10. The coupling arrangement according to claim 1, wherein at least the partial bodies (34, 36) are structurally identical.

11. The coupling arrangement according to claim 1, wherein the first connecting means and the mating connecting means have electrical plugs (20) and corresponding plug receptacles (22) on the housings (8, 10) in order to create the electrical plug-type connection (24).

12. The coupling arrangement according to claim 11, wherein the plugs (20) and plug receptacles (22) are each provided on both housings (8, 10) in order to create the electrical connection (24) in a paired manner.

13. The coupling arrangement according to claim 11, wherein the plugs (20) and the plug receptacles (22) have contact clamps (50) and contact blades (52) onto which the contact clamps (50) are capable of being slipped.

14. The coupling arrangement according to claim 1, wherein at least one of the first unit (2) and second unit (4) are formed by fluid-cooled printed circuit boards.

15. The coupling arrangement according to claim 14, wherein at least one of the housings (8, 10) is capable of being mounted via a plug-type connection (104) to the respective printed circuit board.

16. The coupling arrangement according to claim 15, wherein the plug-type connection (104) is provided at an edge (124) of the printed circuit board at which a cooling channel (K1; K2) exits.

17. The coupling arrangement according to claim 15, wherein the plug-type connection (104) can be created via a connecting ferrule (106) that is capable of being connected to a cooling channel (K1; K2) of the printed circuit board via a first connection (110) and to one of the line segments (26; 28) via a pluggable second connection (115).

18. The coupling arrangement according to claim 17, wherein the connecting ferrule (106) has an electrically conducting outside that is insulated with respect to a fluid channel (116) extending through the connecting ferrule (106).

19. A coupling arrangement (6) for releasably connecting a first line segment (26) provided on a first unit (2) to a second line segment (28) provided on a second unit (4), comprising:
first connecting means which are capable of being fastened to the first unit (2);
mating connecting means which are capable of being fastened to the second unit (4) and which are fixable to the connecting means; and
a control device (32) capable of being positioned between the first line segment (26) and the second line segment (28), the control device being switchable between a blocked position in which the connection between the first line segment (26) and the second line segment (28) is blocked, and a flow position in which the connection between the first line segment (26) and the second line segment (28) is open;
wherein the control device (32) has a control body (30) supported for rotation between the blocked position and the flow position which is positionable in a space between the first line segment (26) and the second line segment (28) and in which an intermediate line segment (38) is embedded via which the first line segment (26) is connectable to the second line segment (28), and
wherein said coupling arrangement further comprises:
translationally adjustable actuating means for adjusting the control body (30); and a direction change gear unit (96) provided between the control body (30) and the actuating means.

20. The coupling arrangement according to claim 19, wherein an intermediate cross section (ZQ) of the intermediate line segment (38) matches a first cross section (Q1) of the first line segment (26) and a second cross section (Q2) of the second line segment (28).

21. The coupling arrangement according to claim 19, wherein the intermediate line segment (38) is provided in a through bore of the control body (30).

22. The coupling arrangement according to claim 19, wherein the first connecting means and mating connecting means on the control body (30) have form-closure means and mating form-closure means via which a form closure between both line segments (26, 28) is capable of being created in the flow position, the form closure being releasable in the blocked position.

23. The coupling arrangement according to claim 19, wherein the first connecting means and mating connecting means have locking means (16) and mating locking means (18), by means of which the line segments (26, 28) are capable of being locked to one another regardless of the position of the control device (32).

24. The coupling arrangement according to claim 19, further comprising plug elements, and wherein the control body (30) has a substantially cylindrical outer surface and is guided through a substantially cylindrical inner surface (35, 37) of the plug elements (86, 88).

25. The coupling arrangement according to claim 19, further comprising a housing, and wherein the control body (30) has a ring-section-shaped edge (60) functioning as a form-closure means and forming a form-closed connection with a mating form-closure means on the housing according to the rotational position of the control body (30).

26. The coupling arrangement according to claim 19, wherein the first and second line segments (26, 28) and the intermediate line segment (38) form at least one electric line.

27. The coupling arrangement according to claim 19, wherein the actuating means is formed by a slide switch (90) that is supported so as to be translationally slidable.

28. The coupling arrangement according to claim 27, wherein the direction change gear unit (96) is formed by a linear toothing (92) of the slide switch (90), the linear toothing being in combing engagement with an arcuate toothing (94) of the control body (30).

29. The coupling arrangement according to claim 19, wherein the first and second line segments (26, 28) and the intermediate line segment (38) form at least one fluid line.

30. The coupling arrangement according to claim 29, wherein the coupling arrangement (6) has both at least one electric line as well as at least one fluid line, both of which are capable of being connected via the control body (30).

31. The coupling arrangement according to claim 19, wherein the control body (30) has a first partial body (34) which is guided on a first plug element (86) assigned to the first line segment (26), and a second partial body (36) which is guided on a second plug element (88) assigned to the second line segment (28), and both partial bodies (34, 36) are capable of being contacted to one another.

32. The coupling arrangement according to claim 31, wherein the first connecting means and mating connecting means are on the first partial body (34) and have coding means (12) that are capable of being plugged together with mating coding means (14) of the second partial body (36).

33. The coupling arrangement according to claim 31, wherein the control body (30) has male elements (66) on one of the partial bodies (34, 36) and female elements (68) complementary to the male elements on the respective other partial body (34, 36), the male and female elements being capable of being plugged together in the blocked position along an assembly direction (M) and creating a form closure in the flow position along the assembly direction (M).

34. The coupling arrangement according to claim 31, wherein at least the first and second partial bodies (34, 36) are structurally identical.

* * * * *